(12) United States Patent
Chowanic

(10) Patent No.: US 8,706,410 B2
(45) Date of Patent: Apr. 22, 2014

(54) NAVIGATION SYSTEM WITH ENHANCED POINT OF INTEREST ARRIVAL GUIDANCE

(75) Inventor: Andrea Bowes Chowanic, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/549,750

(22) Filed: Jul. 16, 2012

(65) Prior Publication Data

US 2014/0019039 A1    Jan. 16, 2014

(51) Int. Cl.
*G01C 21/32* (2006.01)

(52) U.S. Cl.
USPC .......................................... 701/426; 701/438

(58) Field of Classification Search
None
See application file for complete search history.

(56) References Cited

U.S. PATENT DOCUMENTS

| | | | |
|---|---|---|---|
| 6,336,111 B1 * | 1/2002 | Ashby et al. | 701/461 |
| 6,542,817 B2 | 4/2003 | Miyaki | |
| 6,571,169 B2 | 5/2003 | Miyaki | |
| 6,816,781 B2 | 11/2004 | Imanishi | |
| 6,909,968 B2 | 6/2005 | Yokota | |
| 7,395,154 B2 | 7/2008 | Kikuchi et al. | |
| 7,603,231 B2 | 10/2009 | Ogawa | |
| 7,640,099 B2 | 12/2009 | Tran | |
| 7,668,649 B2 * | 2/2010 | Onishi | 701/426 |
| 7,672,779 B2 * | 3/2010 | Fuchs | 701/426 |
| 7,698,062 B1 | 4/2010 | McMullen et al. | |
| 7,865,302 B2 | 1/2011 | Hatazawa | |
| 2010/0145606 A1 | 6/2010 | Finn et al. | |

OTHER PUBLICATIONS

NAVTEQ Network for Developers—NAVTEQ Digital Map Overview, Apr. 9, 2007.

* cited by examiner

*Primary Examiner* — Helal A Algahaim
*Assistant Examiner* — Donald J Wallace
(74) *Attorney, Agent, or Firm* — Jennifer M. Stec; Brooks Kushman P.C.

(57) ABSTRACT

A computer-implemented method for delivering arrival guidance comprising of receiving inputs defining a destination point of interest (POI). The method includes determining whether the destination POI has a parent-child POI relationship with respect to a second POI. The method further includes outputting guidance at a predetermined distance from the destination POI, wherein the guidance comprises a notification concerning the parent-child relationship between the destination POI and the second POI.

20 Claims, 5 Drawing Sheets

NAVIGATION SYSTEM WITH ENHANCED POINT OF INTEREST ARRIVAL GUIDANCE

TECHNICAL FIELD

The illustrative embodiments generally relate to an apparatus and method for providing enhanced arrival guidance for a vehicle navigation system.

BACKGROUND

Parent/child relationships may be published in geographic data files (GDFs) and are referred to as relationship feature code 1026. However, dependent upon which GDF map supplier is used, the representation may be different. For example, NAVTEQ of Chicago, Ill. publishes a point of interest (POI) database with a feature code disclosing a parent/child relationship. In the NAVTEQ database, the relationship features code between two service (POIs) with a physical relationship that carries a value of P. Services may have up to or more than 100 children. In the TELEATLAS database, multi-tenant coding is provided by their POI partner, Infogroup to support service belonging to service relationship. Tenant coding of "C" would be used for buildings with multiple tenants.

U.S. Pat. No. 6,542,817 illustrates a route search method in a navigation system in which POI (Point of Interest) information regarding POIs is incorporated in map information and a route up to a specified POI is searched for. When a POI has a plurality of gateways, identification data for road links connected respectively to the gateways is incorporated in the POI information. When a certain POI is set as the destination, the navigation system refers to the POI information and checks whether a plurality of road links are stored corresponding to the set POI. If so, the system searches for a route up to each of the road links, and determines an optimum one of the found routes as the guide route.

US Patent Application 2010/0145606 illustrates a method for representing locations in a geographic database in a manner that facilitates navigation and routing. A core map database includes data that represents public roads in a geographic region. Each of a plurality of location map databases includes data that represent facilities, such as businesses, stores, offices, or other places, that are physically located away from the public network and access to which requires travel on paths away from the public road network. Each of the facilities represented in the location map databases is assigned a location reference code that is associated with data from which a path connecting the facility and the public road network can be determined.

U.S. Pat. No. 7,603,231 illustrates a navigation system that guides a user to a destination with an improved arrival detection capability when the selected destination is a large facility or a natural place that occupies a relatively large area. When a particular destination is specified by the user, the navigation system calculates a route to the destination based on the address of the specified destination. The navigation system also checks whether the specified destination is associated with polygon data. When the specified destination is associated with the polygon data, the navigation system creates an arrival detection start range. After reaching the arrival detection start range, the navigation system detects the arrival at the destination when any part of the polygon of the destination comes within an arrival detection range of the navigation system.

SUMMARY

A first illustrative embodiment includes a guidance system comprising a point of interest (POI) database that includes one or more attributes indicating a parent-child relationship between two or more POIs. The guidance system further includes a processor configured to receive input defining a destination POI, determine whether a parent-child relationship exists with respect to the destination POIs, and output a notification concerning the parent-child POI relationships with respect to the destination POI when the guidance system is a predetermined distance from the destination POI.

A second illustrative embodiment includes a computer-implemented method for delivering arrival guidance comprising of receiving inputs defining a destination point of interest (POI). The method includes determining whether the destination POI has a parent-child POI relationship with respect to a second POI. The method further includes outputting guidance at a predetermined distance from the destination POI, wherein the guidance comprises a notification concerning the parent-child relationship between the destination POI and the second POI.

A third illustrative embodiment includes a non-transitory computer readable storage medium storing instructions that when executed by a processor causes the processor to receive inputs defining a destination point of interest (POI). The processor also determines whether the destination POI has a parent-child POI relationship with respect to a second POI. The processor further outputs guidance at a predetermined distance from the destination POI, wherein the guidance comprises a notification concerning the parent-child relationship between the destination POI and the second POI.

DETAILED DESCRIPTION

Figure 1:
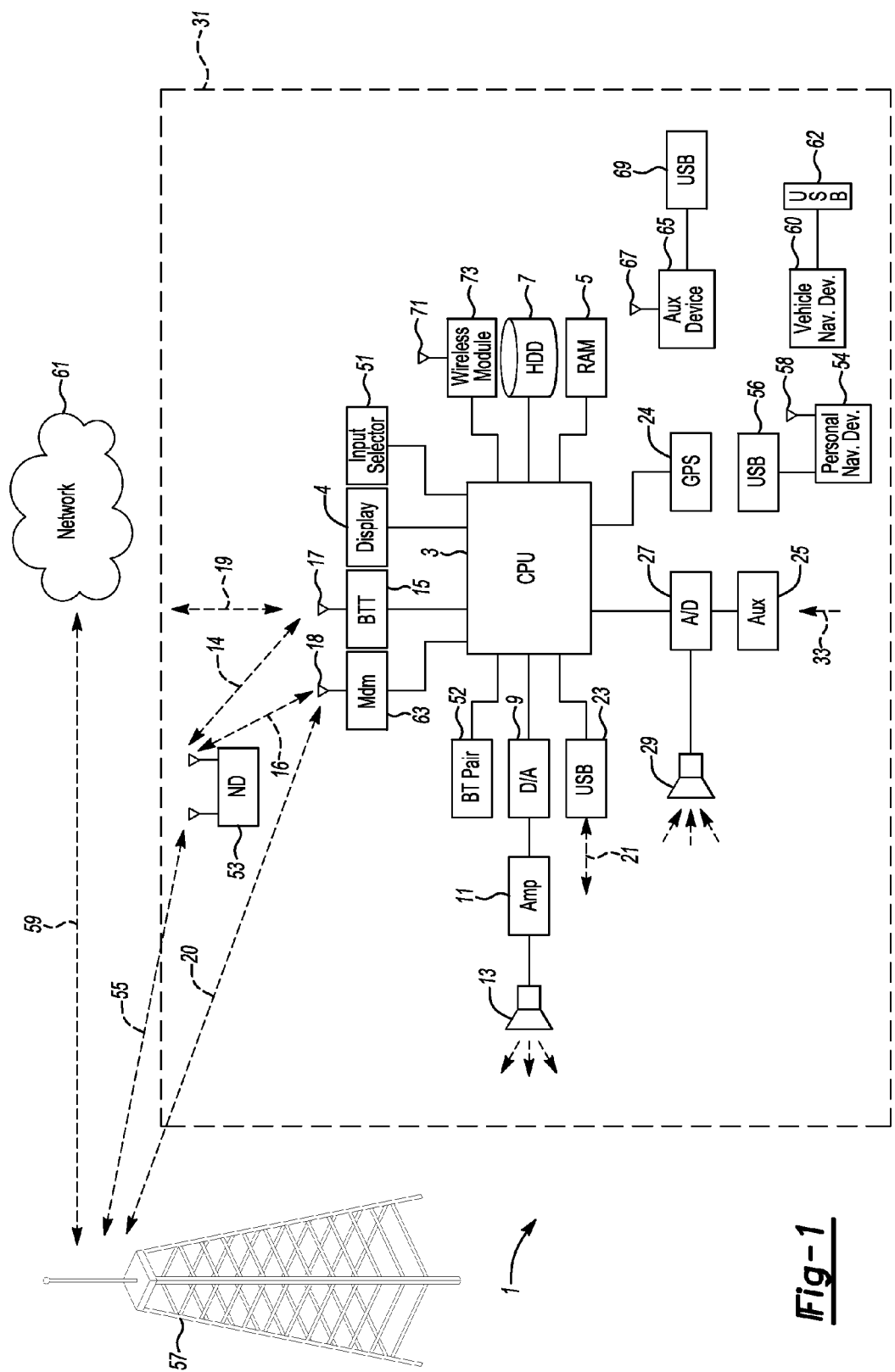
FIG. 1 illustrates an example block topology for a vehicle based computing system for a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention now will be described more fully hereinafter with reference to the accompanying drawings, in which illustrative embodiments of the invention are shown. This invention, may however, be embodied in many different forms and should not be construed as limited to the embodiments set forth herein. Like numbers refer to elements throughout. As used herein the term "and/or" includes any and all combinations of one or more of the associated listed items.

The processes described illustratively herein can be implemented as computer code stored on a machine readable storage medium and executed by a processor. Storage medium include, but are not limited to, HDD, CDs, DVDs, RAM, ROM, flash drives, or any other suitable storage medium.

A conventional navigation system operates by accessing a database to retrieve map information and a point of interest database. A point of interest (POI) can be any named physical location. A POI may include both commercial and residential establishments. POIs that may contain another point of interest inside of them are considered parent POIs. The POIs inside of the parent POI are considered children POIs. In one illustrative example, a shopping mall may be considered a parent POI. The tenants inside of the shopping mall, such as restaurants or retail shops, may be considered the child POIs.

Further, a parent/child POI can also be referred to as a service in service relationship. For example, the child POI may not necessarily be located inside of a parent POI. In one illustrative example, a rental car agency, although not physically located inside of an airport, may be associated with an airport. The rental car agency may be considered a child POI and the airport may be considered the parent POI. Another illustrative example may be a stadium and a parking lot. The stadium may be considered the parent POI, and any parking lots associated with the stadium may be considered child POIs.

Table 1 located below illustrates some demonstrative examples:

| Parent | Child |
|---|---|
| Shopping malls | Stores, restaurants, ATMs, Cinemas |
| Departments Stores | Concession stores/services, restaurants |
| Airports | Stores, bars & restaurants, ATMs, car rental, hotels |
| Office Buildings/Towers | Stores, Restaurants, ATMS |
| Hotels | Stores, Bars & Restaurants, ATMs, car rental, |
| Rest Areas | Stores, Restaurants, ATMS, Fuel Stations |
| Hospitals/Medical Complexes | Stores, Restaurants, ATMS |
| Governmental Buildings | Stores, Restaurants, ATMS |
| Theaters | Stores, Restaurants, ATMS |
| Museums | Stores, Restaurants, ATMS |
| Railway Stations | Stores, Restaurants, ATMS |

Parent/child relationship may be published in geographic data files (GDFs) and are referred to as relationship feature code 1026. However, dependent upon which GDF map supplier is used, the representation may be different. For example, in the NAVTEQ database, the relationship features code between two service (POIs) with a physical relationship that carries a value of P. Services may have up to or more than 100 children. In the TELEATLAS database, multi-tenant coding is provided by their POI partner, Info group to support service belonging to service relationship. Tenant coding of "C" would be used for buildings with multiple tenants. These buildings would be considered the parents.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to select between various inputs. Input to both the microphone and the auxiliary connector is converted from analog to digital by a converter 27 before being passed to the processor. Although not shown, these and other components may be in communication with the VCS over a vehicle multiplex network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, nomadic device, key fob and the like.

Also, or alternatively, the CPU could be connected to a vehicle based wireless router 73, using for example a WiFi (IEEE 803.11) 71 transceiver. This could allow the CPU to connect to remote networks in range of the local router 73.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
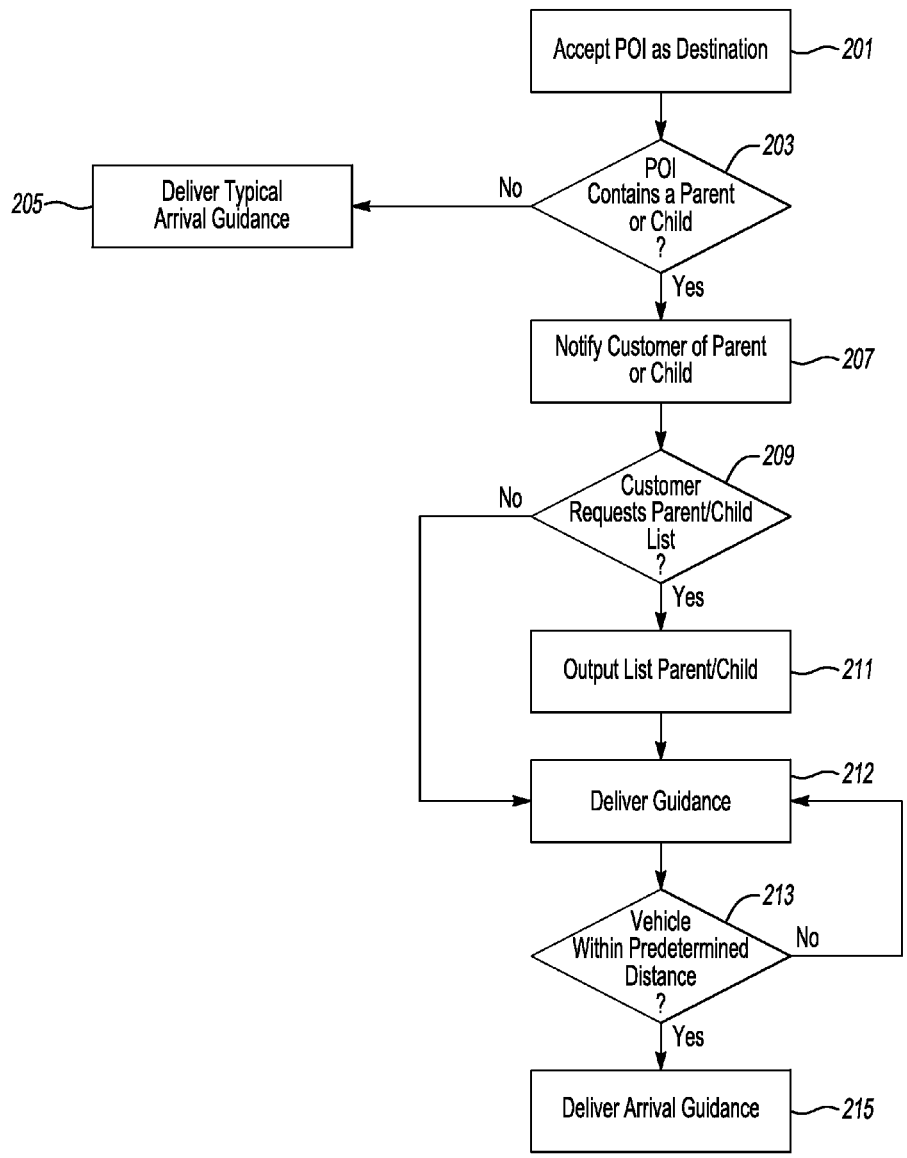
FIG. 2 shows an illustrative flow chart of a inputting a point of interest as a destination and delivering arrival guidance based on a parent-child relationship.

Referring now to FIG. 2, an illustrative flow chart of inputting a point of interest as a destination within a navigation system is depicted. The illustrative flow chart of FIG. 2 may be executed by processor on a VCS, a mobile phone, tablet, portable navigation device, computer, etc. In one illustrative embodiment, the system is capable of accepting a POI as a destination 201. The illustrative embodiment may be able to receive or input multiple types of destinations, such as, but not limited to, an address, POI, intersection, address book, etc. Furthermore, multiple methods of entering a destination may exist on the navigation system itself, such as utilizing a touch screen, rotary knob, or haptic device to input characters of a destination. Another method may include utilizing voice recognition. However, other methods may utilize a remote location or device which may include, but are not limited to, remote destination sending, operator assistance, or transfer via a wireless or wired device.

Upon entering a destination, the navigation system may determine if the POI is a parent or a child POI 203. The navigation system's processor may analyze the destination in a number of ways to determine if a parent-child relationship exists. In one illustrative example, the navigation system will analyze the destination to determine if the feature code exists which distinguishes the destination as a POI that contains a parent-child relationship. The feature code may determine that the destination is either a parent or a child. If the destination is a parent POI, the navigation system may then retrieve the children POI associated with the parent. If the destination is a child POI, the navigation system may then detect both the parent POI and other children POI associated with the parent.

In another illustrative example, the navigation system may determine a parent and child POI relationship exists by analyzing the address. For example, the navigation system may determine that the address is located at a specific address, such as 2800 West Big Beaver Road, Troy, Mich. The navigation system will then search all POIs which contain 2800 West Big Beaver Road, Troy, Mich., and determine the associated parent or child POIs. By analyzing the address, other tenants that contain the same address may be associated with the destination.

In another non-limiting example, a destination's latitude and longitude may be analyzed against other POIs within a similar latitude and longitude (or range of coordinates) to determine if a parent-child relationship exists. Furthermore, the category of the destination and nearby categories may be used to determine the likely parent or child relationship. In one example, categories which are more likely to contain tenant's or child POIs, such as a shopping mall or office building, may be logically be assigned a parent relationship, and the nearby POIs with the same or relatively close latitude and longitude may be the child POI.

Other examples of determining whether a parent or child POI exists may include an off-board database search of the POI to determine a parent-child relationship exists with the associated POI. The system may utilize off-board computers or servers to run a similar analysis as explained above.

If the navigation system determines that no parent or child POI exists, the navigation system may continue to deliver traditional arrival guidance upon arrival of the destination 205. The navigation system may continue to deliver traditional guidance until the arrival of the destination. Furthermore, in at least one example, if no parent or child POIs exist, no associated list of other POIs can be determined. In one illustrative example, the navigation system may state "You have arrived at your destination" upon arriving at destination with no associated parent or child POI.

If the navigation system determines that a parent or child POI exists for the destination, the navigation system may notify the user of the parent and/or child POI 207. The navigation system may then present to the user the option to request detailed information of the parent or child relationship 209. In one illustrative example, the navigation system may deliver an audible announcement based upon the existence of the parent/child relationship. In another illustrative example, the navigation system may utilize voice recognition to prompt the user. For example, the navigation system may state "Your destination has multiple tenants. Please say 'Yes' to see detailed information or say 'No'". If the user elects to not view the parent/child POI list, the user bypasses the output list and may still be notified of the relationship upon arrival at the destination.

In another illustrative example, the navigation system display screen may display a POI information screen which visually displays the existence of the parent or child relationship. In yet another example, the navigation system display may include an on-screen button to request the detailed information. The user/customer may be able to press the on-screen button in order to see the parent or children POIs associated with the destination.

If the user requests the navigation system to see more information regarding the relationship, the navigation system may output a list of the parent or children POIs 211. FIG. 3B and FIG. 3D are illustrative examples of the on-screen lists that may be utilized. In another illustrative example, the system may audibly output a list of any parent or child POIs that are associated with the destination. The user may then request more detailed information of the parent or child POI, such as, but not limited to, the name, address, phone number, POI category, hours of operation, customer reviews, etc.

Upon a user entering the destination and beginning to drive to the destination, the navigation system will deliver guidance 212 to the destination. The navigation system may deliver audible guidance, such as, but not limited to, voice guidance of an upcoming maneuver. Furthermore, the navigation system may deliver visual guidance, such as, but not limited to, a turn indicator on a display screen. Traffic and weather information may be utilized to dynamically alter guidance to the destination.

During the user's commute to the destination, the navigation system will determine if the user has arrived at the destination 213 in order to determine when the navigation system will output arrival guidance notifying the user that they have arrived at their destination. The navigation system may utilize a threshold distance based on the type of road to deliver guidance. In one illustrative example, the navigation system may deliver arrival guidance on a residential road 1000 feet from the destination. In another illustrative example, the navigation system may deliver arrival guidance on a main surface street a quarter-mile from the destination. Furthermore, in another illustrative example, the navigation system may utilize other factors to determine the arrival guidance, such as the vehicle's speed, traffic information, number of lanes on the road, etc. If the navigation system has determined that the user has not arrived at the destination or arrived at the threshold distance, the navigation system will continue to deliver guidance maneuvers 212 to guide the user to destination.

Upon arrival at the destination or at predetermined distance from the destination, the navigation system may deliver arrival guidance to the user 215. The arrival guidance may be a visual alert and/or an audible alert. For example, one illustrative example of the audible alert may notify the customer that a parent or child POI relationship exists. The navigation system may output to the speakers "You have arrived at your destination. Your destination may be inside of a larger building." In another illustrative example, the navigation system may deliver arrival guidance notifying the user that the navigation system is inside of a specific destination.

In another illustrative example, the navigation system may output to the speakers "You have arrived at your destination. Your destination is inside of The Somerset Collection." The navigation system's processor may directly or indirectly communicate with a visual display, amplifier, speaker, etc. to output a notification that a parent-child POI relationship exists. To deliver output of the specific parent or child POI relationship that exists, the navigation system may utilize phonetic data associated with the point of interest, a text to speech engine, a pre-recorded sound file, etc. Furthermore, the navigation system may deliver different arrival guidance based on a parent or child relationship existing, wherein the parent or child is located at a different physical address. In one illustrative example, the arrival guidance may state "You have arrived at your destination. Your destination is associated with the Detroit Metropolitan Airport."

Figure 4A:
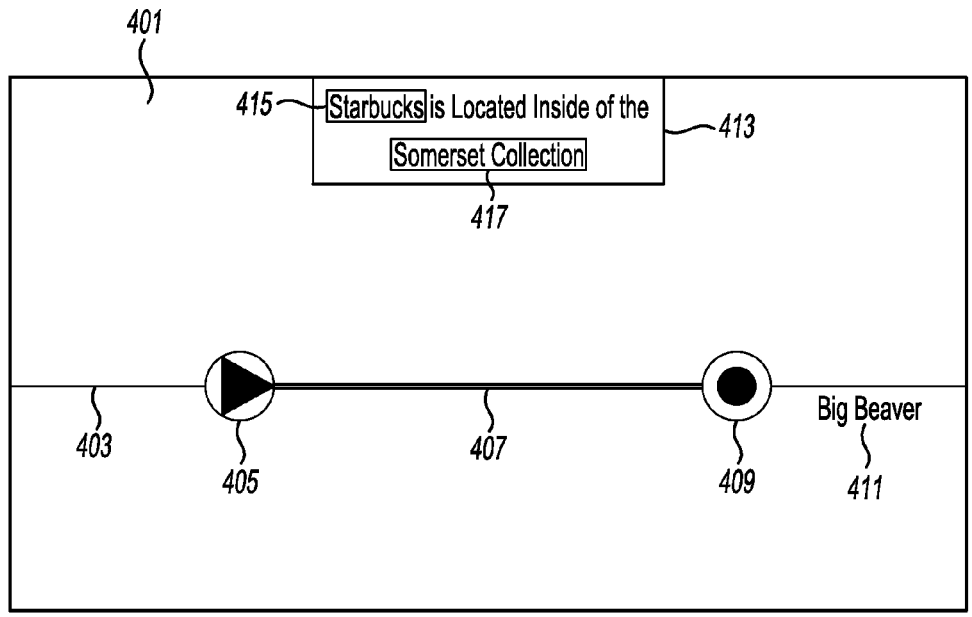
FIG. 4A shows an illustrative screen for displaying the arrival guidance of a child POI.
Figure 4B:
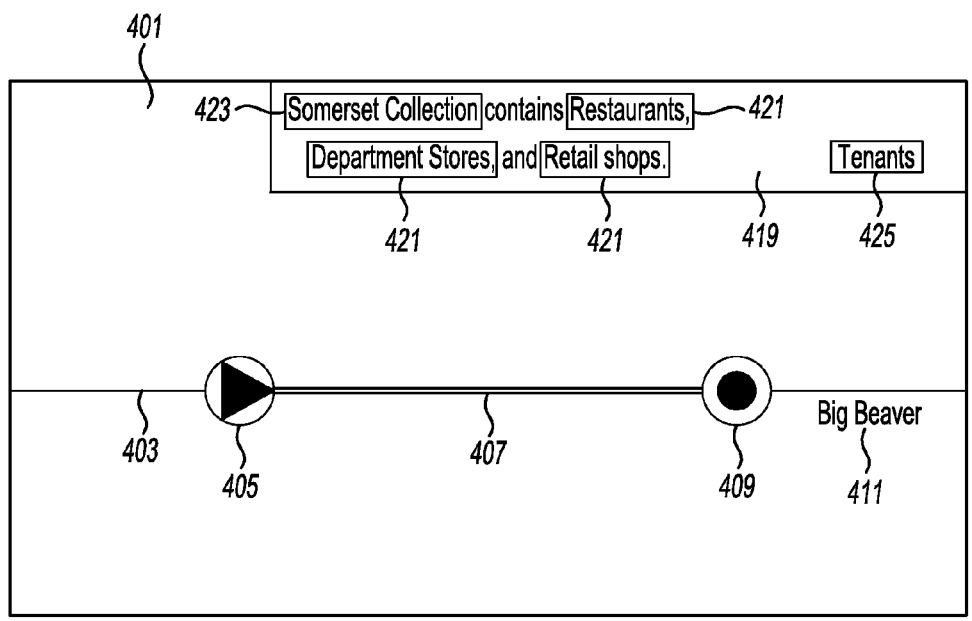
FIG. 4B shows an illustrative screen for displaying the arrival guidance of a parent POI.

Additionally, the arrival guidance may utilize a visual display to output the parent or child relationship exists to the customer. The display may indicate both a general relationship exists, and it may detail the specific parent or child POI that exists with the POI of interest. FIG. 4A and FIG. 4B show illustrative examples of displays with visual indicators of a parent or child POI exists.

Although exemplary processes and methods are shown herein, it is understood that these are for illustrative purposes only. One of ordinary skill would understand that the steps thereof could be performed in any suitable order to produce the desired results. Further, one of ordinary skill would understand that some and/or all of the steps could be replaced by similar processes that produce similar results and/or removed if not necessary to produce the desired results in accordance with the illustrative embodiments. For example, the computer system may output a list 211 of all parent or child POIs of an input destination after arrival guidance 215 is delivered. In yet another illustrative embodiment, the computer system may notify the customer of a parent or child relations 211 after initial guidance 212 is started.

Figure 3A:
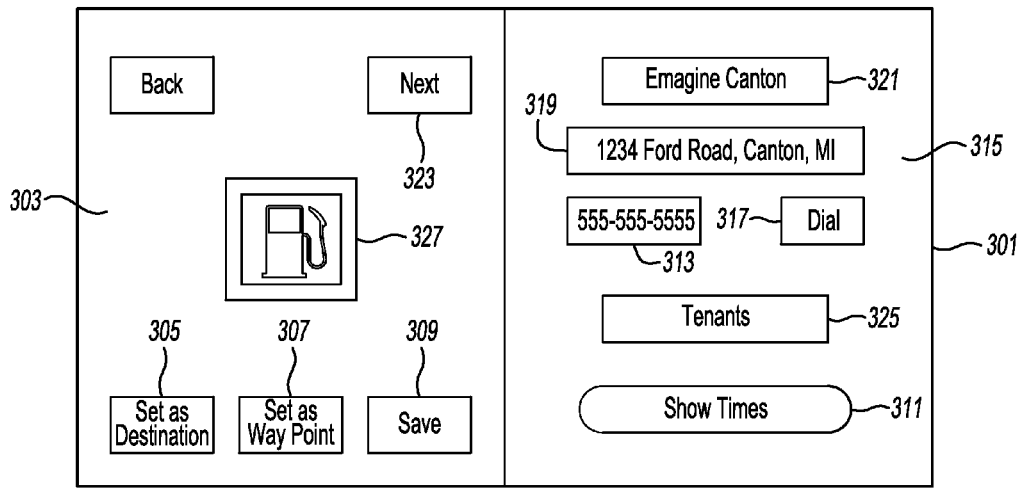
FIG. 3A shows an illustrative screen for displaying a parent point of interest information screen.
Figure 3B:
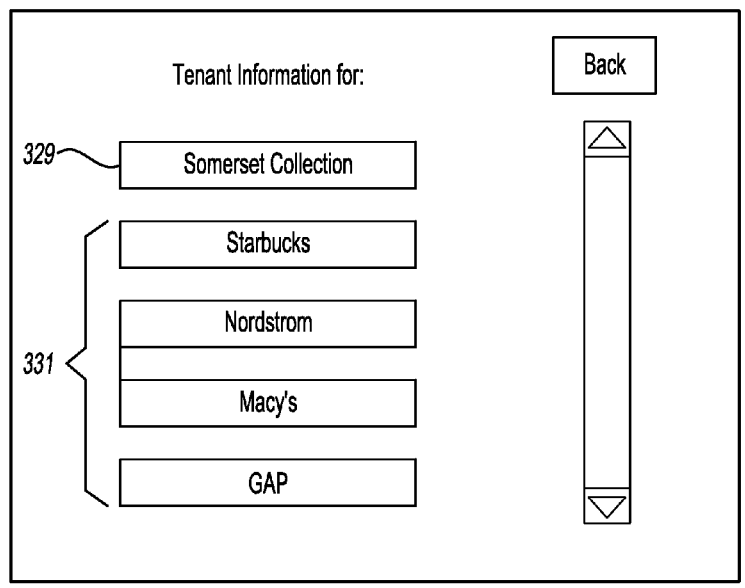
FIG. 3B shows an illustrative screen for displaying a child information screen.

Referring now to FIG. 3A, an illustrative screen for displaying a parent point of interest information screen 301 is depicted. In one illustrative embodiment, the screen 301 may be displayed after the user searches for a point of interest as a destination through the touch screen or by a voice recognition system. The parent point of interest information screen 301 may contain a map 303 to illustrate the location of the destination. Further, the screen 301 may allow the user to set the POI as a destination 305, as a waypoint 307, or add it to a user's address book 309.

The parent point of interest information screen 301 may also include a detailed information section 315 to output relevant information regarding the parent POI. Furthermore, the screen 301 may contain dynamic information 311 about the POI, such as but not limited to, user reviews, store hour, show times, fuel prices, etc. The information may include the name of the POI 321, the address 319, the phone number 313, and an option to dial the POI 317 if connected to a phone. Other information not depicted may be shown, such as but not limited to, coordinates, cross streets, etc. Furthermore, the parent POI information screen may allow the user the option to output all the tenants by selecting a "Tenant" button 325. The "Tenant" button 325, may then transition the user to another screen which lists all the tenants, as depicted in FIG. 3B.

Furthermore, the parent point of interest information screen 301 may also display an icon 327 representing the POI. In order to differentiate the parent POI from a normal POI without a parent-child relationship, the icon 327 may contain different shading. In one illustrative example, when a parent POI icon is displayed on the map, a green halo around them may signify that they contain other POIs inside of them. In another illustrative example, an audible output, may be output to signify that they contain other POIs inside of them when a user selects the POI.

Referring now to FIG. 3B, an illustrative screen of displaying child information is depicted. The screen may be displayed upon a customer request of displaying the tenant information of a parent POI 329. The navigation system will determine the associated children POIs of the parent POI to populate the list 331 of children POIs. The navigation system may determine the children POIs by utilizing a database which supports the parent-child POI attribute or by analyzing the address of the parent POI for other POIs located at the same address. Once populated the tenant information screen may list all of the tenants located within the parent POI. The tenant information screen may be scrollable in order to navigate through the complete list of children POIs. Furthermore, the tenant information screen may be searchable/selectable or be filterable by POI category, distance, etc.

Figure 3C:
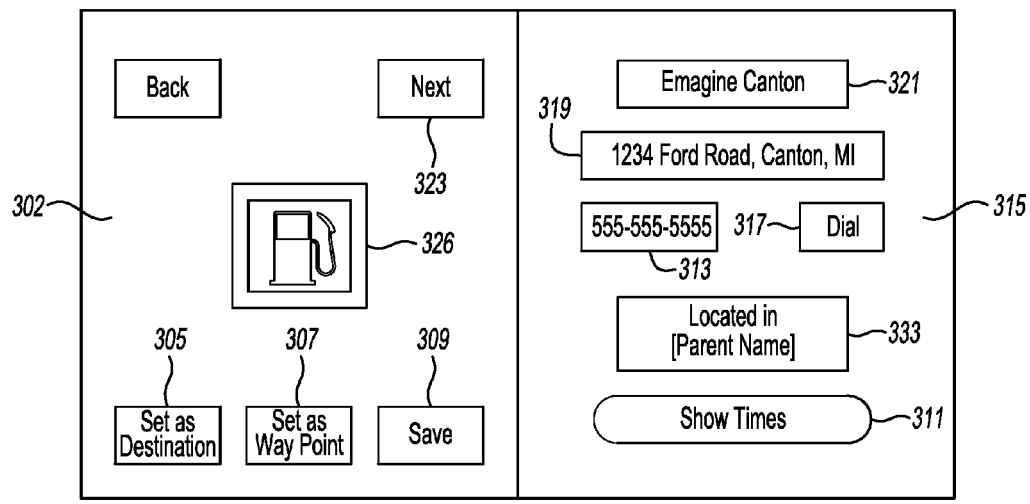
FIG. 3C shows an illustrative screen for displaying a child point of interest information screen.
Figure 3D:
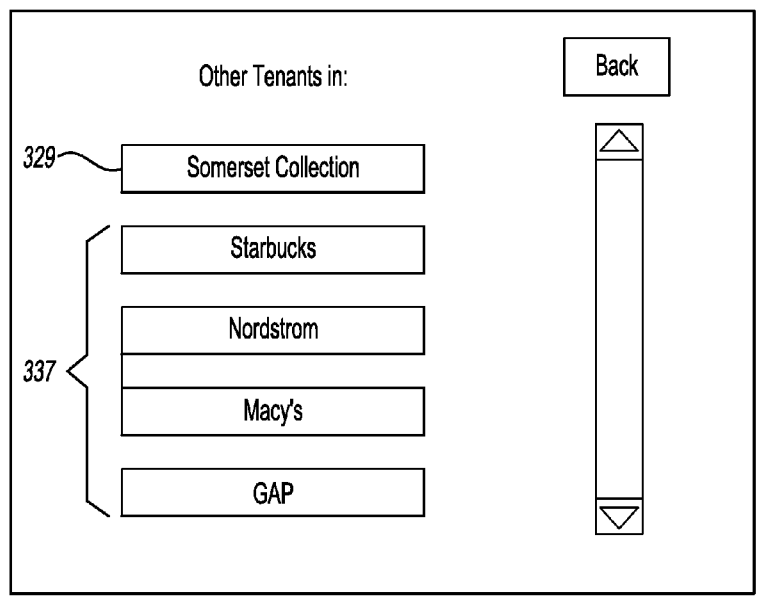
FIG. 3D shows an illustrative screen for displaying the parent POI and associated children information.

FIG. 3C shows an illustrative screen for displaying a child point of interest information screen 302. The screen 302 may be displayed after the user searches for a point of interest as a destination through the touch screen or by a voice recognition system. The child point of interest information screen 302 may be similar in design to the parent POI screen. The screen 302 contains a map 303 to illustrate the location of the destination. Further, the screen 302 may allow the user to set the POI as a destination 305, as a waypoint 307, or add it to a user's address book 309.

The child point of interest information screen 302 may also include a detailed information section 315 to output relevant information regarding the child POI. Furthermore, the screen 302 may contain dynamic information 311 about the POI, such as but not limited to, user reviews, store hour, show times, fuel prices, etc. The information may include the name of the POI 321, the address 319, the phone number 313, and an option to dial the POI 317 if connected to a phone. Other information not depicted may be shown, such as but not limited to, coordinates, cross streets, etc. Furthermore, the child POI information screen may allow the user the option to output all the associated children POIs by selecting a "Parent" button 333. The "Parent" button 333, may then transition the user to another screen which lists all the other tenants or children POIs, as depicted in FIG. 3D.

Furthermore, the child point of interest information screen 302 may also display an icon 326 representing the child POI. In order to differentiate the child POI from a normal POI without a parent-child relationship, the icon 326 may contain different shading. In one illustrative example, when a child POI icon is displayed on the map, a red halo around them may signify that they contain other POIs inside of them. In another illustrative example, an audible output, may be output to signify that they contain other POIs inside of them. For example, if a user selects the icon 326, an announcement may be made which states the category of the parent POI, such as, but not limited to, "This POI is located inside of a shopping mall".

Referring now to FIG. 3D, an illustrative screen for displaying the parent POI and associated children information is depicted. The screen may be displayed upon a customer requesting to display the parent information of a parent POI 329. This screen will allow a user to view other tenants or children POIs associated with their destination. The navigation system will determine the other associated children POIs of the parent POI to populate the list 337 of associated children POIs. The navigation system may determine the children POIs by utilizing a database which supports the parent-child POI attribute. In another illustrative example, the navigation system may determine the other children POIs by analyzing the address of the parent POI for other POIs located at the same address. Once populated, the tenant information screen may list all of the tenants located within the parent POI. The tenant information screen may be scrollable in order to navigate through the complete list of children POIs. Furthermore, the tenant information screen may be searchable or be filterable by POI category, distance, etc.

It should be noted that the screens depicted in FIGS. 3A-3D are only illustrative. Other screen designs and features may be included besides the ones depicted. For example, the screens may include additional information regarding each parent or child POI. Furthermore, the indicators used to identify a parent child relationship for icons 326 and 327 may be different, such as but not limited to, utilizing a specific icon to represent the parent or child POI.

Referring now to FIG. 4A, an illustrative screen for displaying the arrival guidance of a child POI is depicted. A map 401 may be depicted in the arrival guidance screen. A road segment 403 with an associated road name 411 for which the child POI destination 409 may be located may also be displayed. The current vehicle position 405 may be depicted on the screen. Upon arrival at a predetermined threshold 407, arrival guidance may be prompted on the display and through the speakers. The arrival guidance may notify a user that they have arrived at their destination 409. The notifications may occur in multiple occurrences. For example, but without limitation, audible arrival guidance may occur twice, once upon arriving at the threshold scale and once upon arrival at the destination.

In one illustrative example, upon arrival at the destination, may include both audible notification and visual notification 413. The visual notification 413 may list the child POI destination 415 and list the parent POI 417. In one illustrative scenario, a customer enters a coffee shop, e.g. STARBUCKS, located in a shopping mall, e.g. SOMERSET COLLECTION, as the destination. Upon arrival at the destination, the visual notification 413 may display "STARBUCKS is located inside of SOMERSET COLLECTION." In the same scenario, another illustrative example upon arrival of the destination may include the visual notification 413 displaying "Your destination is located inside of another point of interest." Furthermore, accompanied audible notification may describe the arrival guidance by utilizing the vehicle's speakers.

Referring now to FIG. 4B, an illustrative screen for displaying the arrival guidance of a parent POI is depicted. A map 401 may be depicted in the arrival guidance screen. A road segment 403 with an associated road name 411 for which the child POI destination 409 may be located may also be displayed. The current vehicle position 405 may be depicted on the screen. Upon arrival at a predetermined threshold 407, arrival guidance may be prompted on the display and through the speakers. The arrival guidance may notify a user that they have arrived at their destination 409. The notifications may occur in multiple occurrences. For example, but without limitation, audible arrival guidance may occur twice, once upon arriving at the threshold scale and once upon arrival at the destination.

In one illustrative example, upon arrival at the destination, may include both audible notification and visual notification 419. The visual notification 419 may list the parent POI destination 423 and the other categories of tenants 421 in the parent POI. In one illustrative scenario, a customer enters a mall, e.g. SOMERSET COLLECTION, as the destination. Upon arrival at the destination, the visual notification 419 may display "SOMERSET COLLECTION contains restaurants, department stores, and retail shops." In the same scenario, another illustrative example upon arrival of the destination may include automatically displaying a tenant button 425. Upon a user selecting the tenants button 425, a list of tenants may be populated, similar to FIG. 3B. Furthermore, accompanied audible notification may describe the arrival guidance by utilizing the vehicle's speakers.

It should be noted that the screens depicted in FIGS. 4A and 4B are only illustrative. Other screen designs and features may be included besides the ones depicted. For example, the screens may include additional information regarding each associated parent or child POI. Furthermore, upon arrival at the child destination, a prompt may be output to determine if a user would like to retrieve additional information regarding other tenants or a detailed map of the parent POI.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A guidance system in a vehicle comprising:
   a point of interest (POI) database including one or more attributes indicating a parent-child relationship between two or more POI; and
   a processor configured to:
   (i) receive input defining a destination POI;
   (ii) determine whether a parent-child relationship exists with respect to the destination POI based on the one or more attributes; and
   (iii) when the parent-child relationship exists with respect to the destination POI, output arrival guidance indicating the relationship when the vehicle is a predetermined distance from the destination POI, wherein the predetermined distance is based on a type of road the vehicle is traveling on.

2. A guidance system as in claim 1, wherein the processor is configured to determine whether a parent-child POI relationship exists based on utilization of the parent or child POI's address.

3. A guidance system as in claim 1, wherein the attributes include an address, a latitude and/or longitude, or a parent-child POI indicator.

4. A guidance system as in claim 1, wherein the arrival guidance indicates that the destination POI is a parent or child POI.

5. A guidance system as in claim 4, wherein the arrival guidance is output as an audible notification.

6. A guidance system as in claim 4, wherein notification the arrival guidance is output as a visual notification.

7. A guidance system as in claim 1, wherein the predetermined distance is further based on a current speed of the vehicle.

8. A guidance system as in claim 1, wherein the predetermined distance is further based on traffic information.

9. A guidance system as in claim 1, wherein the predetermined distance is further based on a number of lanes on the road.

10. A method for outputting arrival-guidance in a vehicle, comprising:
receiving inputs defining a destination point of interest (POI);
determining whether the destination-POI has a parent-child relationship with respect to a second POI; and
outputting arrival-guidance at a predetermined distance from the destination-POI, wherein the arrival-guidance includes a notification concerning the parent-child relationship and the predetermined distance is based on a road-type the vehicle is traveling on and a speed of the vehicle.

11. The method of claim 10, wherein determining whether the destination POI contains a parent-child POI relationship includes utilizing a destination POI attribute to determine whether a parent or child POI exists.

12. The method of claim 10, wherein determining whether the destination POI contains a parent-child POI relationship includes comparing an address of the destination with other POIs, wherein POIs with the same address as the destination are determined to have a parent-child relationship with the destination.

13. The method of claim 10, wherein the notification indicates that the destination POI is a parent POI.

14. The method of claim 10, wherein the arrival guidance indicates that the destination POI is a child POI.

15. The method of claim 10, wherein the arrival guidance is output as an audible notification.

16. The method of claim 15, wherein the audible notification is processed by utilizing a text to speech engine.

17. The method of claim 10, wherein the notification is output as a visual notification.

18. The method of claim 17, wherein the visual notification is output as a list comprising of at least one child POI.

19. The method of claim 10, wherein the arrival guidance includes a notification indicating a parent POI in which the destination POI is located within.

20. A non-transitory computer readable storage medium storing instructions that when executed by a processor causes the processor to:
receive inputs defining a destination point of interest (POI);
determine whether the destination-POI has a parent-child POI relationship with respect to a second POI; and
output arrival-guidance in a vehicle upon arrival at the destination-POI, wherein the arrival-guidance includes a notification indicating the parent-child relationship and the arrival-guidance is output based on a road-type the vehicle is traveling on.

* * * * *